June 1, 1926.

J. E. JOHNSON ET AL

1,587,325

LABELING MACHINE

Filed Jan. 18, 1921      7 Sheets-Sheet 3

Inventors
John E. Johnson
Charles H. Oslund
by attorneys

Witness
C. F. Wesson

June 1, 1926.

J. E. JOHNSON ET AL

LABELING MACHINE

Filed Jan. 18, 1921

Patented June 1, 1926.

1,587,325

UNITED STATES PATENT OFFICE.

JOHN EMANUEL JOHNSON AND CHARLES H. OSLUND, OF WORCESTER, MASSACHUSETTS, ASSIGNORS TO THE O. & J. MACHINE COMPANY, OF WORCESTER, MASSACHUSETTS, A CORPORATION OF MASSACHUSETTS.

LABELING MACHINE.

Application filed January 18, 1921. Serial No. 438,069.

The object of this invention is to provide a new and improved bottle labeling machine by which labels can be rapidly gummed, applied to and smoothed out on a bottle.

The invention is illustrated in the accompanying seven sheets of drawings, referring to which and in detail

Figure 6:
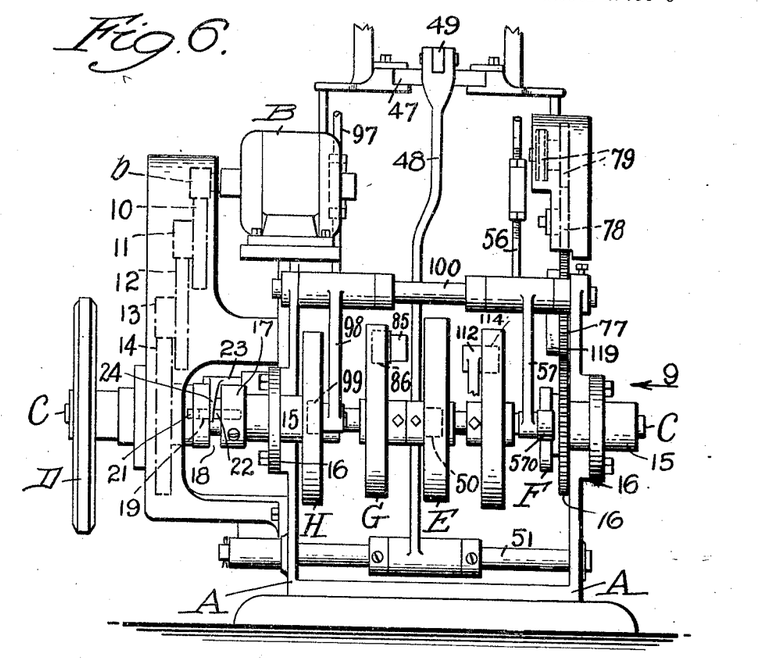
Fig. 6 is a rear elevation.
Figures 7, 8:
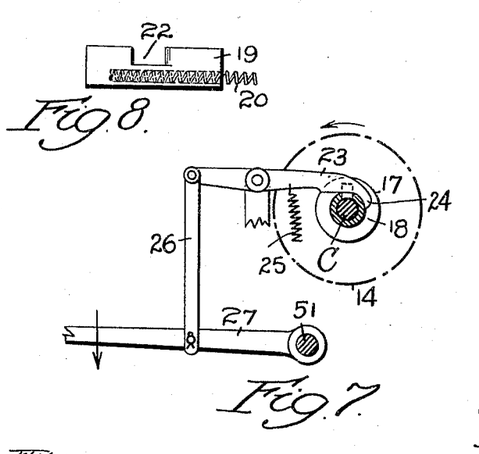
Figs. 7 and 8 are details of the clutch.
Figure 9:
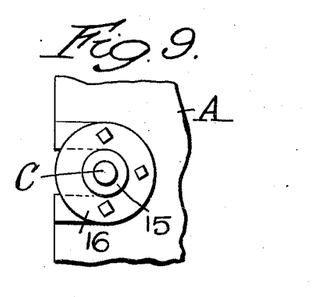
Fig. 9 is an end view of the bearing for the cam shaft.

Referring to the drawings and in detail, A designates the framework of the machine, mounted on which is a motor B on the shaft of which is a pinion $b$, which, through reducing gears 10—11 and 12—13 drives a gear 14 loosely mounted on a cam shaft C having a fly wheel D. The cam shaft C is journalled in bearings 15 fitted in slots in the framework and having collars 16 held thereto by screws or bolts so that the cam shaft and cams can be assembled and easily placed in position. Secured on the cam shaft is a driving hub or clutch 17 having a groove 18. A key 19 is socketed in said driving hub and is pushed to the left (Fig. 6) by a spring 20. The key registers with a notch or mortise 21 in the hub of the gear 14. The key is provided with a notch 22. A pivoted lever 23 has a wedge shaped end 24 set in position to rest in the groove 18 and to engage the notch 22 in the key 19. This wedge end of the lever is normally pulled down by a spring 25 as is illustrated in Fig. 7. The end of the lever 23 is connected by a link 26 to a pivoted foot lever 27. Normally the parts are in the position shown in Fig. 7. When the foot lever is depressed the wedge end 24 of the lever 23 is raised above the sliding key 19 and the key is forced outwardly in the driving hub 17 to engage in the hole 21 in the hub of the gear 14 and thus to connect the motor to rotate the cam shaft C. When the foot lever 27 is released the wedge end 24 of the lever 23 drops down into the groove 18 and the rotation of the gear 14 causes the key to engage the wedge end 24 of the lever which will move the key out of the hub on the gear 14 and stop the rotation of the cam shaft. Thus the parts operate only when the foot lever is depressed.

The label holder will now be described. The same consists of a bracket 28 pivoted to the framework A extending from which are rods 29—29 adjustably mounted on which are cross pieces 30—30. Wing pieces 31—31 are adjustably secured to the rear cross piece 30. Extending down from the cross pieces 30—30 and the wing pieces 31—31 are side bars 32 which have inwardly extending toes 33. The rectangular space between said bars 32 forms the label holder or receptacle.

By adjusting the parts previously described this receptacle can be set to hold labels of various sizes. The toes 33 only extend inward a slight distance so that the lowermost label can be easily drawn downward from the pile past the same. A supplemental bracket 34 is secured to the bracket 28 and extending up through the same is a shaft 35 which carries a plunger or weight 36 at its lower end which rests on top of the pile or labels and tends to push the same downwardly. A guiding loop 37 is adjustably secured to the supplemental bracket 34, and held in the same, between pins 38—38, is a locking piece 39 having a hole through which the shaft 35 passes. The shaft 35 is provided with a notch 40 and with a handle or knob 41. By pulling up on the handle 41 the plunger 36 may be raised away from the label receptacle and left in raised position when the locking piece 39 engages the notch 40 which can be manually released. By the adjustments described the plunger or weight can be set to various sized labels. The labels are put in position by lifting up the plunger 36 and by putting them in position in the holder under the same.

Figure 1:
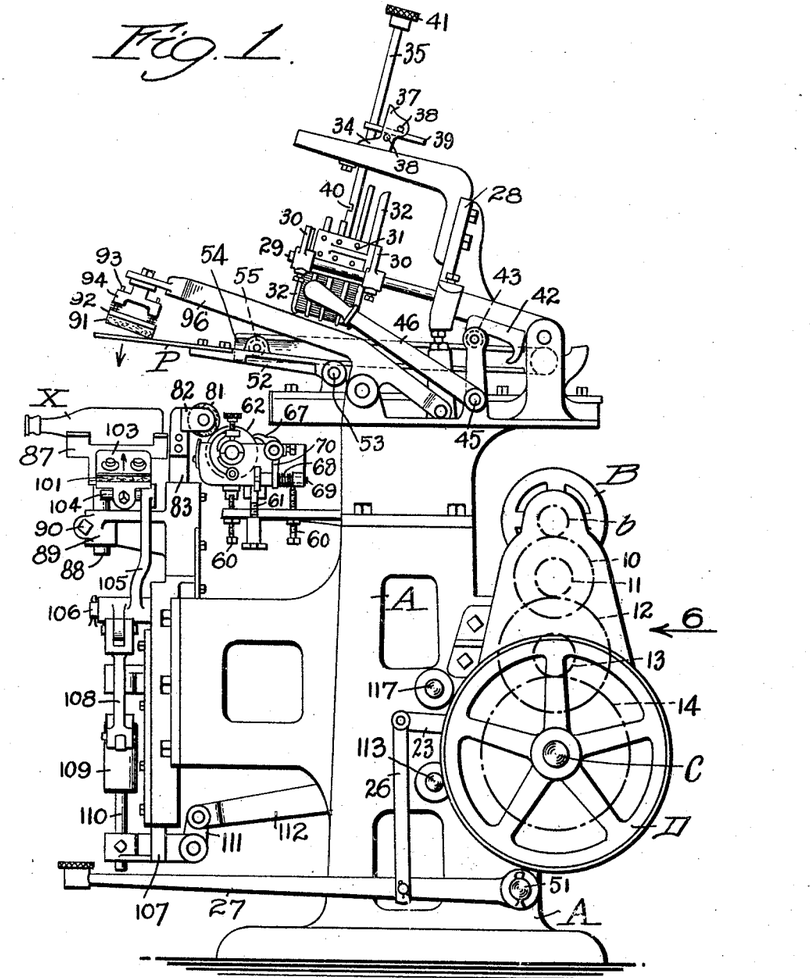
Fig. 1 is a side elevation.
Figures 2, 3, 4, 5:
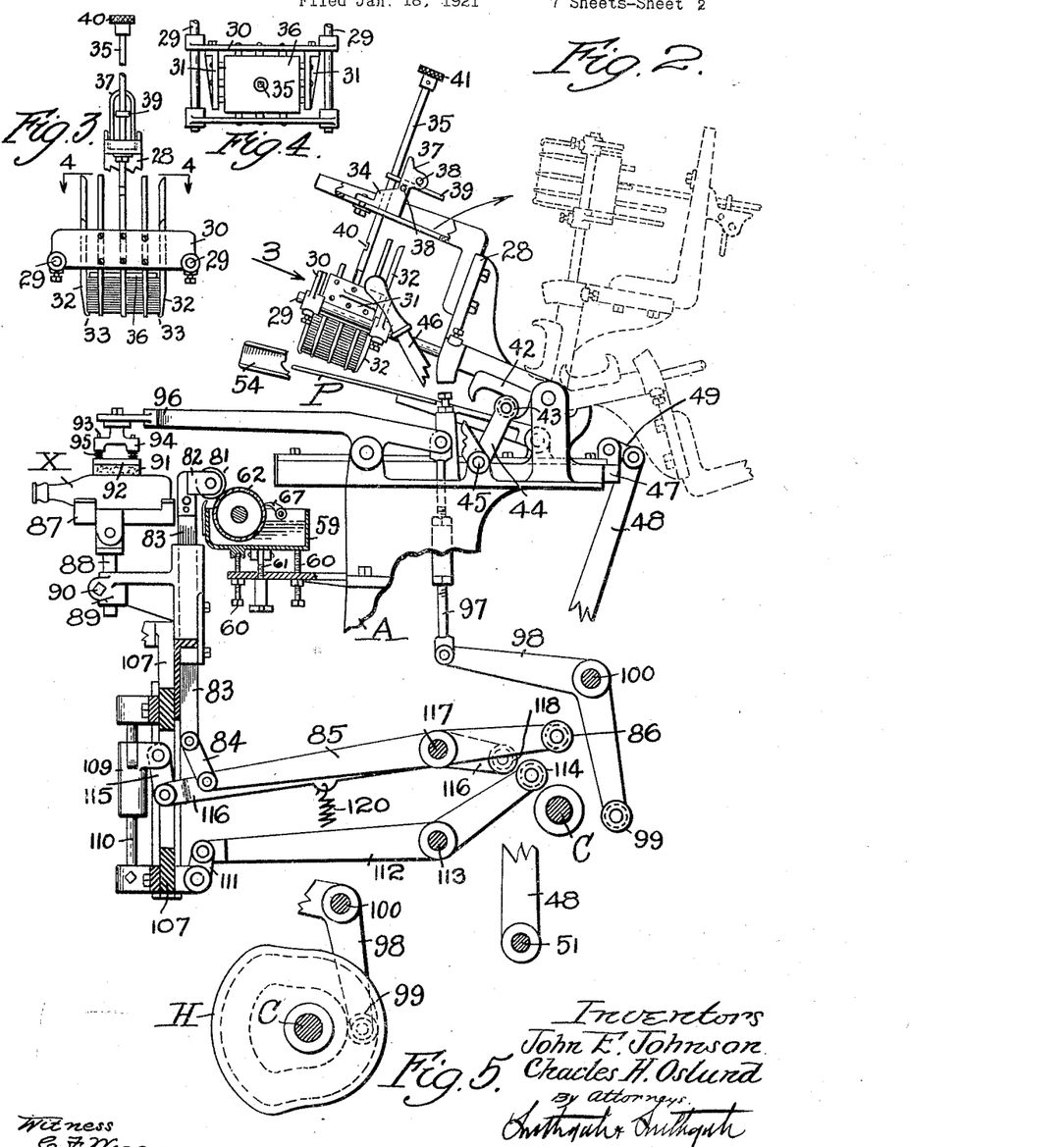
Fig. 2 is a sectional elevation.
Figs. 3 and 4 are details of the label holder.
Fig. 5 is a detail of the label gripper cam.

Mounted on the side of the bracket 28 is a cam piece 42, which is engaged by a roller 43 mounted on an arm 44 secured on a short shaft 45 journalled in a hub on the framework A and having an operating handle 46. When the handle is in the position shown in Fig. 1, the bracket 28 is lowered and the label holder stands in operative position. When the operating handle 46 is thrust to the position shown in Fig. 2, the bracket 28, and hence the label holder, will be raised and held in raised position so that the pickers hereinafter described will not co-act therewith. This permits the machine to be operated without having labels supplied thereto which is useful in starting up the machine and getting the pickers properly gummed. The bracket 28 and hence the label holder may be rocked on its pivots as indicated in Fig. 2 to allow easy access to the pickers and various parts of the mechanism.

Figures 10, 11, 12, 13:
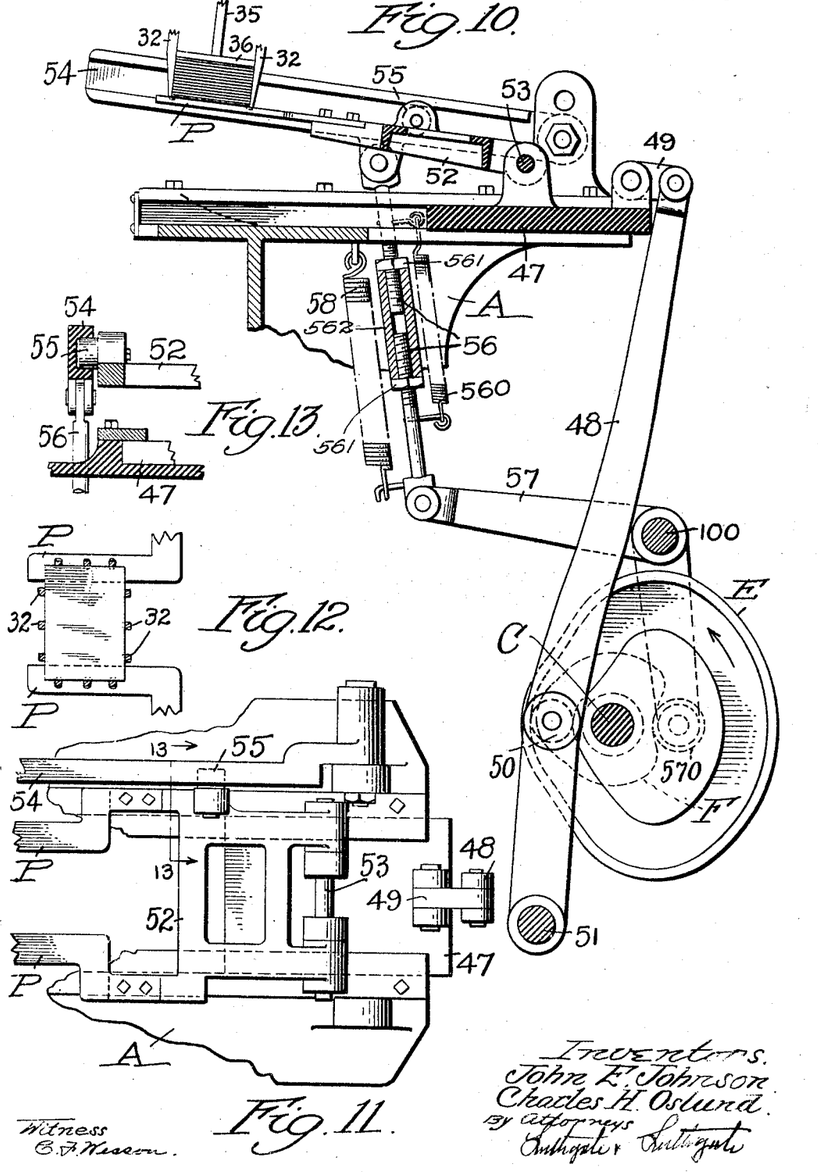
Fig. 10 is an enlarged sectional view of the picker operating mechanism.
Fig. 11 is a plan of the picker slide.
Fig. 12 is a plan showing the relation between the pickers and label holder.
Fig. 13 is a detail of the operating mechanism for the picker slide.

The pickers and the operating mechanism therefor will now be described. A slide 47 is fitted in ways in the frame and is reciprocated back and forth by a lever 48 connected thereto by a link 49 which lever carries a roller 50 fitting in a cam E on the cam shaft C. The lever 48 is pivoted on a shaft 51 secured in the framework and which shaft also can be conveniently employed as the pivot of the foot lever 27. A frame 52 is pivoted on a shaft 53 secured in brackets formed on the slide 47 and the pickers P—P are secured to this frame. The pickers are shaped to engage the undermost label in the holder on two parallel edges and are provided with small holes $p$ as illustrated in Fig. 12 so that the toes 33 of the side bars 32 will not prevent the pickers from engaging the undermost label. A slotted guideway 54 is pivoted to a hub on the main frame and engaging the same is a roller 55 mounted on a stud secured in a hub formed on the frame 52. A link 56 is connected to the guideway 54 which link is made in two sections the ends of which are threaded and which have nuts 562 thereon, said ends fitting loosely into a tube 561, which construction forms an adjustable lost motion connection. The link 56 is connected to a bell crank lever 57 having a roller 570 engaging a cam F on the cam shaft C. A spring 58 is arranged normally to move the guideway 54 upwardly.

It will be noticed that the cam F is a face cam which acts only to move the roller 570 to the right, the spring 58 keeping the roller 570 in contact with the cam. This will allow the surface of the cam to move slightly away from the roller 570 as the spring 58 raises the pickers P into contact with the lowermost label.

These parts are arranged so that as the pickers approach the right hand extreme of their travel (Fig. 2), the same will be moved upwardly by the spring 58 into engagement with the lowermost label in the label holder. By reason of this arrangement the pickers will nicely engage the label with a somewhat yielding action. The pickers then move downwardly to draw the label out of the receptacle. The pickers then move to the left over the bottle and then downwardly so that the label can be taken therefrom and held on the bottle by the label gripper hereinafter described.

By the lost motion and spring connection in the link 56 before described, if the pickers engage the bottle as they apply the label thereto, a yielding action is provided so that the pickers will not break the bottle. This is important as the bottles vary somewhat in size.

Figures 14, 15, 16:
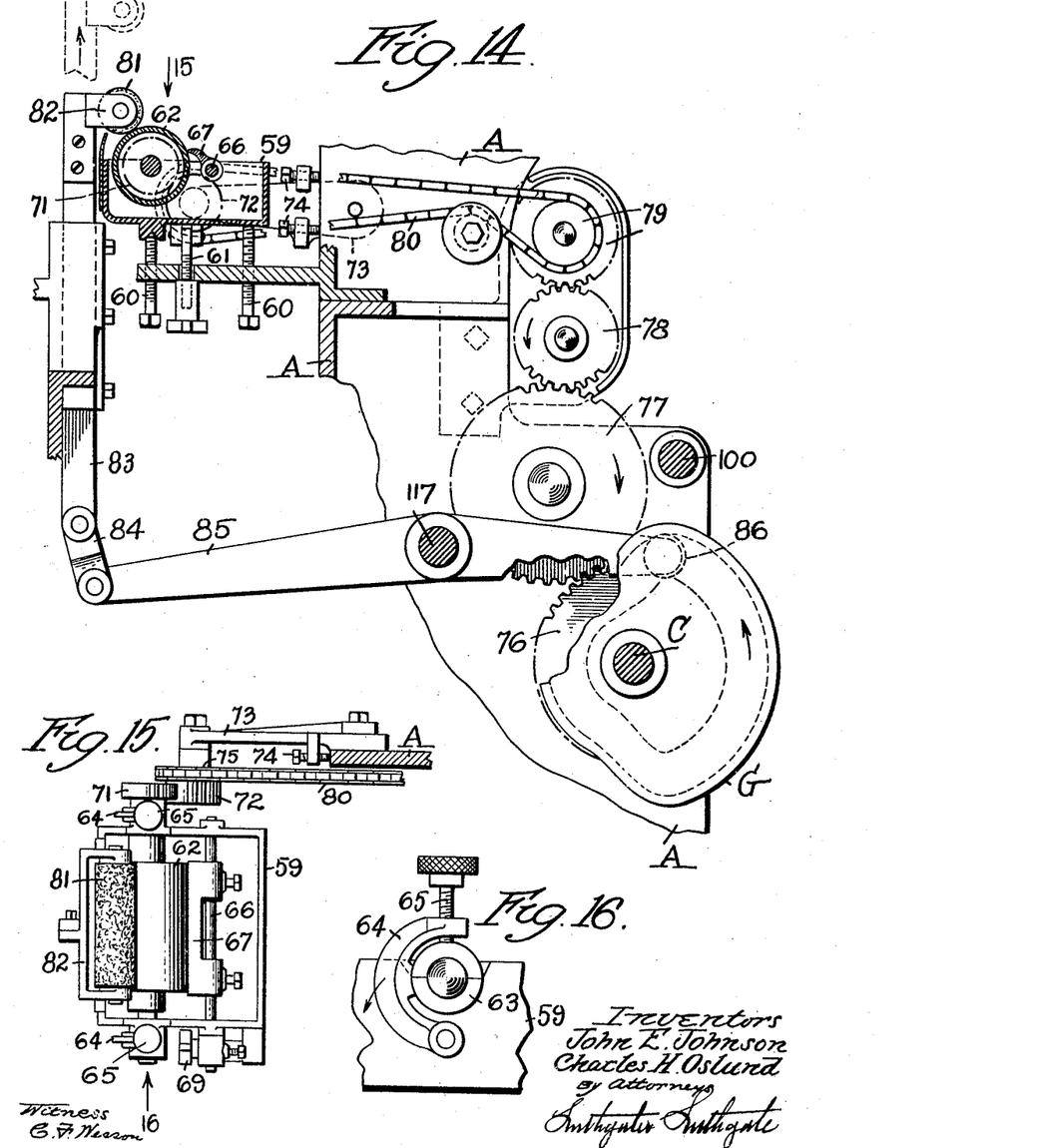
Fig. 14 is a large sectional view of the gumming mechanism.
Fig. 15 is a plan of the same.
Fig. 16 is an enlarged end view of the bearing for the gum fountain.

The gumming mechanism will now be described. A gum fountain 59 is held on four screws 60 threaded into a shelf or ledge forming part of the framework. The fountain is held down in place on the top of said screws by a screw 61 attached to the bottom of the fountain having a knurled end. By this arrangement the fountain can be adjusted to stand in correct position and is removably held in place so that it can be taken out if desired for cleaning. A gum fountain roller 62 is journalled in split boxes 63 held together by a pivoted arm 64 and screw 65 as illustrated in Fig. 16. By this construction the gum fountain roller can be removed for cleaning. A shaft 66 is journalled in the sides of the fountain and mounted on the same is a scraper blade 67 which is set against the gum fountain roller 62 so that as the roller turns it will carry around a film of gum of the desired thickness. The scraper blade is held against the gum fountain roller by a spring 68 mounted on a screw 69 extending through an arm 70 secured on the shaft 66 and having a knob and threaded into a hub on the side of the fountain as illustrated in Fig. 1. The gum fountain roller has a gear 71 on its end which meshes with a gear 72 running on a stud secured in a bracket 73 pivoted to the frame and having screws 74 by which its position can be fixed. A sprocket gear 75 is secured to the gear 72 and the same is driven from the cam shaft C by gears 76, 77 and 78 and a compound gear and sprocket wheel 79 and sprocket chain 80 as illustrated in Fig. 14.

A gumming roller 81 is mounted in a yoke 82 secured to the top of a rod or slide 83 which is mounted in a bearing in the frame so as to be capable of vertical movement. This rod 83 is operated by a link 84 connected to a pivoted lever 85 having a roller 86 bearing in a groove on a cam G secured on the cam shaft. The parts thus described are arranged and timed so that as the pickers move forward the gumming roller will be brought into contact with the gum fountain roller and will take a supply of gum therefrom, so that when the pickers are in their position over the bottle the gumming roller will move upwardly and so that as the pickers move to the right (Figs. 1 and 2) to go under the label the gumming roller will engage the pickers and apply gum thereto so that the pickers can engage the lowermost label in the label holder and apply gum thereto on two of its edges.

The label gripper mechanism will now be described. The bottle X to which the label is to be applied is placed in a V-shaped trough or holder 87 which has a depending shaft 88 fitting in a hub 89 mounted on the framework of the machine, which hub is split and the two parts of which can be drawn together by a screw 90 so that the position of the bottle holder can be adjusted. The gripper consists of a piece of soft material as rubber 91 carried in a holder 92 having rods 93—93 fitted in a carrier 94. Springs 95 are arranged on the rods 93 so that the gripper will engage the label and bottle with a yielding impact. The carrier 94 is secured on the end of a pivoted lever 96, which is connected by a link 97 having an adjustable turn buckle to a bell crank lever 98 having a roller 99 engaging a cam H on the cam shaft C. The bell crank lever 98 and the bell crank lever 57 previously described can be conveniently pivoted by employing a common shaft 100 secured in the frame as illustrated in Fig. 6. The parts last described are so arranged and timed that the gripper 91 will come down on top of the label when the same is carried by the pickers over the bottle and forcibly press and clamp the label on the bottle so that as the pickers thereafter move the label will be left on top of the bottle.

It will be seen that as the pickers move upwardly after the gripper has forcibly engaged and held the label on the bottle the ends of the label will curl upwardly and the stripes of gum will be evened out on the label.

Figures 17, 18:
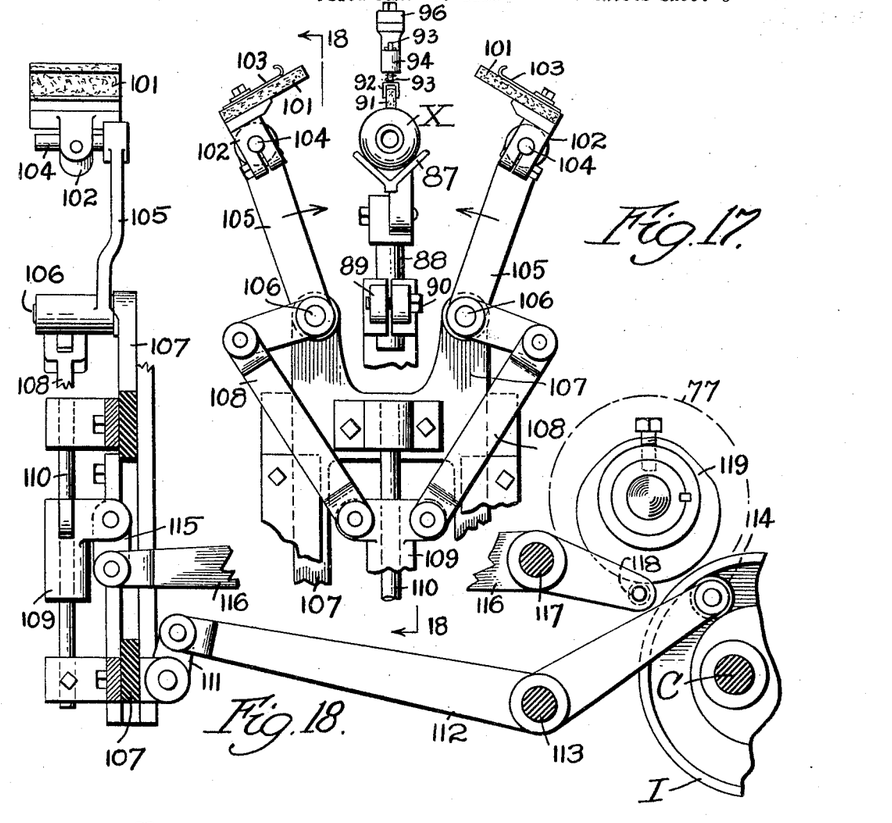
Fig. 17 is an end view on an enlarged scale of the wipers and operating mechanism therefor.
Fig. 18 is a sectional elevation thereof.
Figure 19:
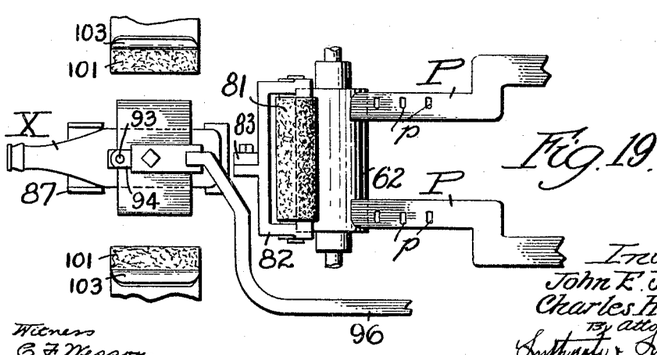
Fig. 19 is a plan illustrating relative arrangement of the main operative parts.

The wiper mechanism for smoothing and applying the label to the bottle will now be described. The wipers consist of strips of soft material 101—101 held in jaws 102 as illustrated in Fig. 17. Plates 103 are secured above the wipers so as to limit their yielding or curling effect. The jaws have split hubs held together by screws, which hubs are fitted on pins 104 carried by bell crank levers 105 pivoted on studs 106 secured in a slide 107, which is fitted to move up and down vertically in ways formed on the framework. The other ends of the bell crank levers are connected by links 108 to a hub 109, which is fitted to slide on a rod 110 secured in hubs formed on the slide 107. The slide 107 is moved upwardly and downwardly by a link 111 connected to a lever 112 mounted on a shaft 113 extending across the machine. The lever 112 has a roller 114 which bears on a cam I secured on the cam shaft. The hub 109 is moved up and down by a link 115 secured to a lever 116 pivoted on a shaft 117 extending across the machine and having a roller 118 bearing on a cam 119 turning with or secured to the gear 77 as illustrated in Fig. 6. This cam is preferably made a face cam and the lever 116 is pulled down by a spring 120. These parts are arranged so that after the label has been left on the bottle, the wipers will move inwardly and then downwardly and will smooth and apply the label to the bottle.

Figure 20:
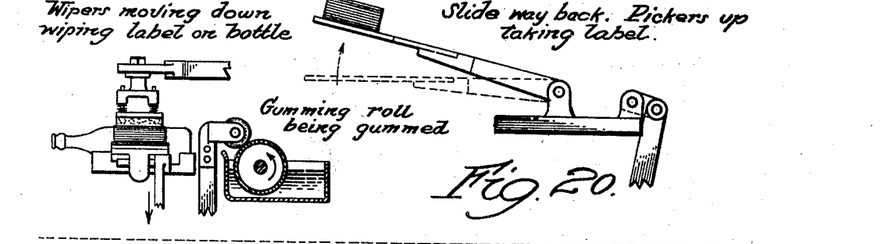
Figs. 20 to 25 inclusive are diagrams illustrating the operation and the relative movements of the parts.
Figure 21:
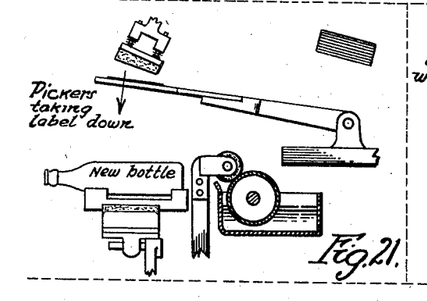
Figure 22:
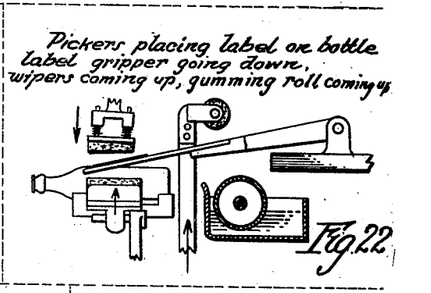
Figure 23:
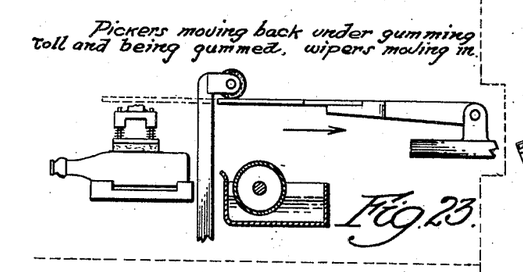
Figure 24:
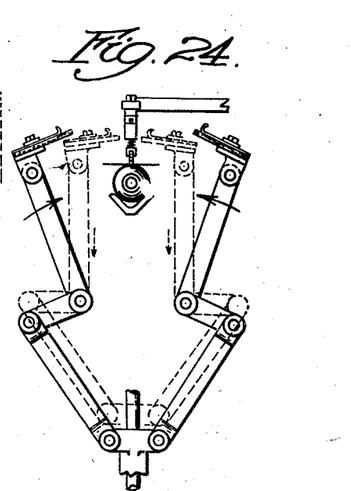
Figure 25:
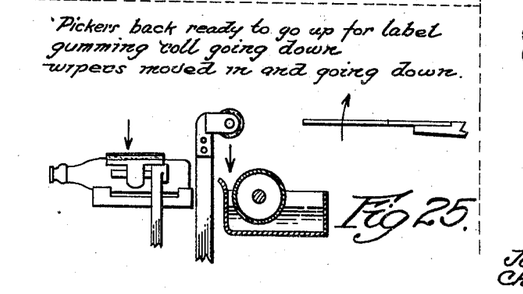

The operation is illustrated in the last sheet of drawings, (Figs. 21 to 25). In Fig. 20 the picker slide is way back and the pickers have just been moved up to engage the lowermost label in the label holder. The gumming roller is down on the gumming fountain roller and is being supplied with gum. In Fig. 21 the pickers have moved forward over the bottle and are swinging downwardly to carry the label down to the bottle. In Fig. 22 the pickers have placed the label on the bottle and the label gripper is coming down. The wipers are coming up and the gumming roller is also moving above the pickers. In Fig. 23 the gripper has clamped the label tightly down on the bottle, the pickers have lifted to disengage from the label and are moving back in engagement with the gumming roller and are being gummed and the wipers are moving inwardly. In Fig. 24 the wipers are indicated as moving inwardly and after they reach the position shown in dotted lines they will move downwardly and will wipe the label tightly on the bottle. In Fig. 25 the pickers are shown back ready to swing up for the next label, the gumming roller is coming down and the wipers have moved in and are coming down to perform the wiping action to secure the label to the bottle.

The operator stands in front of the machine and all that he has to do is to place each bottle in turn in the bottle holder and remove the same after the label is applied. The operator has the machine under full control by the foot lever. With a little practice the operator can run the machine at a very high speed and bottles can be quickly and accurately labeled.

The machine described is very easy to keep clean and in accurate operation and is easily adjustable for various size labels.

It will be noticed that the gumming roller 81 moves up and down vertically relatively to the gum fountain roller 62. This is very advantageous in that all the drip from the gumming roller 81 will drop back on the roller 62 and into the fountain.

The clutch before described is designed so that when the machine comes to rest the pickers will stand over the gum fountain as illustrated in Fig. 23. This is advantageous in that any drip from the pickers while the machine is idle will fall back into the gum fountain.

It also will be noticed that the gumming mechanism and the label holder are placed back of the mechanism which holds the bottle which leaves very free access for the operator to insert the bottles.

It also will be noticed that the entire mechanism is very accessible for cleaning by swinging the label holder to its furthest rearmost position as indicated by the lower dotted lines in Fig. 2.

It also will be noticed by reference to Fig. 10 that the frame-work and guides in which the slide 47 moves which carries the pickers is extended so as to come under the label holder. This is advantageous in that if the pickers should draw more than one label from the label holder the extra label will drop down onto this extension as indicated at dotted lines and will not fall down into the gumming mechanism or operating parts of the machine.

By reference to Fig. 10 it will be seen that the ends of the two part link 56 fit loosely into the connecting tube and are pulled together by a spring 560. This provides a lost motion connection in the means which lowers the pickers down onto the bottle. This will prevent breakage in case the bottle is improperly placed in position.

It also will be noticed that the cam 119 which gives the wipers their sidewise movement is removably held in place on the hub of the gear 77 as indicated in Fig. 17. This permits the same to be removed and replaced by a cam of different contour whereby the sidewise wiping motion of the wipers can be varied for labels of different width.

These points of improvement add much to the efficiency of the machine as when labeling machines stand they are apt to gum up and have to be cleaned before starting again in operation.

While the machine has been primarily designed for applying labels to bottles, it can be used for applying labels to many other articles such as cans or other containers, cylindrical bundles, etc.

The details of the mechanisms herein shown and described may be greatly varied by a skilled mechanic without departing from the scope of our invention as expressed in the claims.

Having thus fully described our invention what we claim and desire to secure by Letters Patent is:—

1. In a labeling machine, the combination of a label holder, pickers, means for moving the same from the label holder over the article to be labeled, a gum fountain, a gumming roller, means for moving the gumming roller so that the same will stand in position to apply gum to the pickers as they move from the article back to the label holder, and a clutch for throwing the same into and out of operation arranged so that when the machine is thrown out of operation the pickers will stand over the gum fountain, whereby drip therefrom will fall back into the fountain.

2. In a labeling machine, the combination of a label holder or receptacle, pickers and means for moving the pickers so that they will move upwardly into contact with the lowermost label and then downwardly to withdraw said label from the holder or receptacle, said means including a face cam, connections between said cam and said pickers, said connections carrying a roller engaging the face cam so that the cam will operate to move the pickers away from the holder, and a spring for holding the roller to the cam, whereby the pickers can engage the lowermost label with a yielding action.

3. In a labeling machine, the combination of a label holder or receptacle, a slide, a frame pivoted to said slide and carrying pickers, a roller carried on said frame, a guideway in which said roller operates, and means for reciprocating said slide and moving the guideway whereby the pickers will be brought up into contact with the lowermost label in the label receptacle and then moved to carry the label away therefrom.

4. In a labeling machine, the combination of a label holder or receptacle, pickers, means for moving the pickers so that they will move from the label holder or receptacle forward and then downwardly to apply the label to the article to be labeled, and a lost motion connection in the means which moves the pickers downwardly.

5. In a labeling machine, the combination of a label holder or receptacle, pickers, means for moving the pickers from the label holder or receptacle over the articles to be labeled, and means arranged under the label holder or receptacle to catch any extra label drawn by the pickers from the label holder or receptacle.

In testimony whereof we have hereunto affixed our signatures.

JOHN EMANUEL JOHNSON.
CHARLES H. OSLUND.